US012684459B2

(12) United States Patent
Cakulev et al.

(10) Patent No.: US 12,684,459 B2
(45) Date of Patent: Jul. 14, 2026

(54) SYSTEMS AND METHODS FOR SUPPORTING NETWORK SLICE ADMISSION CONTROL BASED ON SUBSCRIPTION AND POLICY CONTROL

(71) Applicant: Verizon Patent and Licensing Inc., Basking Ridge, NJ (US)

(72) Inventors: Violeta Cakulev, Milburn, NJ (US); Hossein M. Ahmadi, Parsippany, NJ (US); Robert Avanes, Roanoke, TX (US); Ali Imdad Malik, East Brunswick, NJ (US); Lixia Yan, Basking Ridge, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 434 days.

(21) Appl. No.: 18/334,829

(22) Filed: Jun. 14, 2023

(65) Prior Publication Data

US 2024/0422652 A1 Dec. 19, 2024

(51) Int. Cl.
*H04W 48/08* (2009.01)
*H04W 60/04* (2009.01)

(52) U.S. Cl.
CPC .......... *H04W 48/08* (2013.01); *H04W 60/04* (2013.01)

(58) Field of Classification Search
CPC .............................. H04W 48/08; H04W 60/04
See application file for complete search history.

(56) References Cited

U.S. PATENT DOCUMENTS

| | | | | |
|---|---|---|---|---|
| 2023/0109814 A1* | 4/2023 | Lee | ...................... | H04W 48/18 |
| | | | | 455/434 |
| 2023/0370950 A1* | 11/2023 | Shekhar | ................ | H04W 48/18 |
| 2024/0314886 A1* | 9/2024 | Liang | .................... | H04L 47/803 |
| 2024/0373481 A1* | 11/2024 | Ianev | .................... | H04W 48/06 |
| 2025/0113216 A1* | 4/2025 | Foti | ...................... | H04W 60/00 |
| 2025/0212104 A1* | 6/2025 | Suh | ...................... | H04W 76/11 |

* cited by examiner

*Primary Examiner* — Kevin T Bates
*Assistant Examiner* — Jaeyoung Kwak

(57) ABSTRACT

A first network device of a network may generate a first request for an indication of whether a user equipment is subject to network slice admission control, and may provide the first request for the indication to a second network device of the network. The first network device may receive, based on the first request, the indication of whether the user equipment is subject to network slice admission control, and may generate a second request for network slice admission control information based on the indication indicating that the user equipment is subject to network slice admission control. The first network device may provide the second request for the network slice admission control information to a third network device of the network.

20 Claims, 7 Drawing Sheets

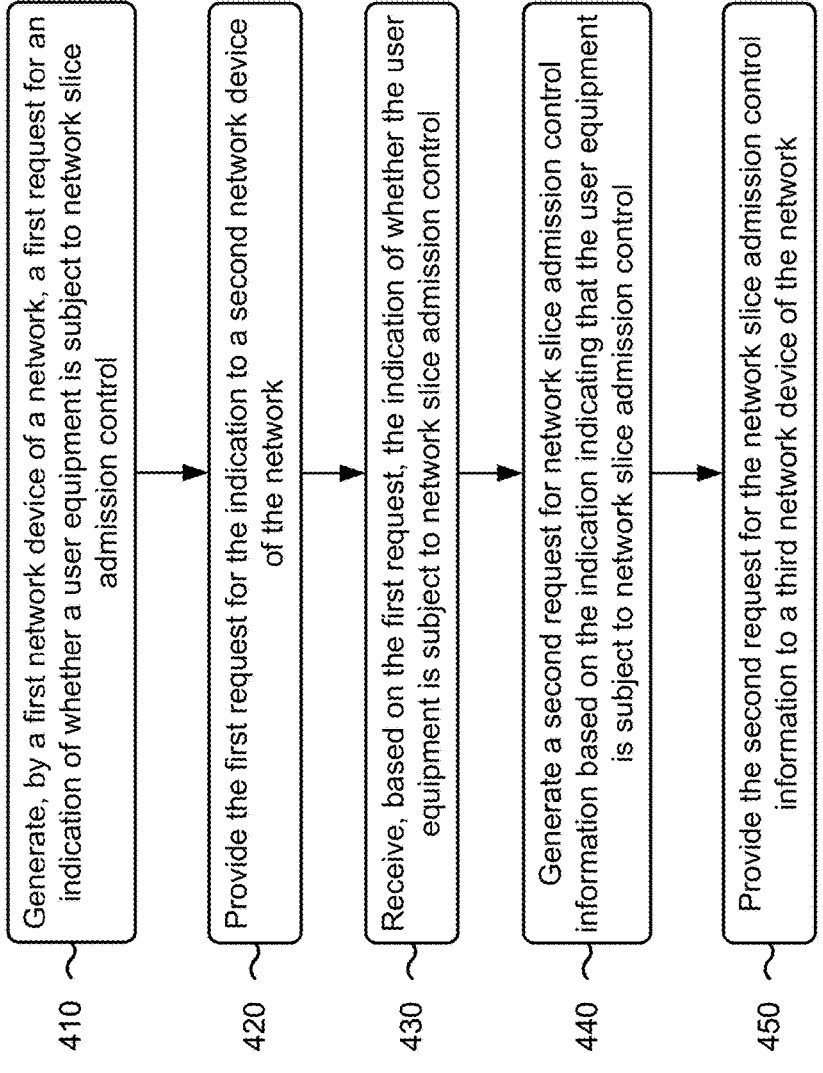

FIG. 4

410 — Generate, by a first network device of a network, a first request for an indication of whether a user equipment is subject to network slice admission control 420 — Provide the first request for the indication to a second network device of the network 430 — Receive, based on the first request, the indication of whether the user equipment is subject to network slice admission control 440 — Generate a second request for network slice admission control information based on the indication indicating that the user equipment is subject to network slice admission control 450 — Provide the second request for the network slice admission control information to a third network device of the network

400

SYSTEMS AND METHODS FOR SUPPORTING NETWORK SLICE ADMISSION CONTROL BASED ON SUBSCRIPTION AND POLICY CONTROL

BACKGROUND

The Third Generation Partnership Project (3GPP) defines a network slice admission control function (NSACF) that monitors and controls a quantity of registered user equipments (UEs) per network slice and/or a quantity of protocol data unit (PDU) sessions per network slice for network slices subject to network slice admission control (NSAC).

BRIEF DESCRIPTION OF THE DRAWINGS

FIG. 4 is a flowchart of an example process for supporting network slice admission control based on subscription and policy control.

DETAILED DESCRIPTION OF EXAMPLE EMBODIMENTS

Figure 1A:
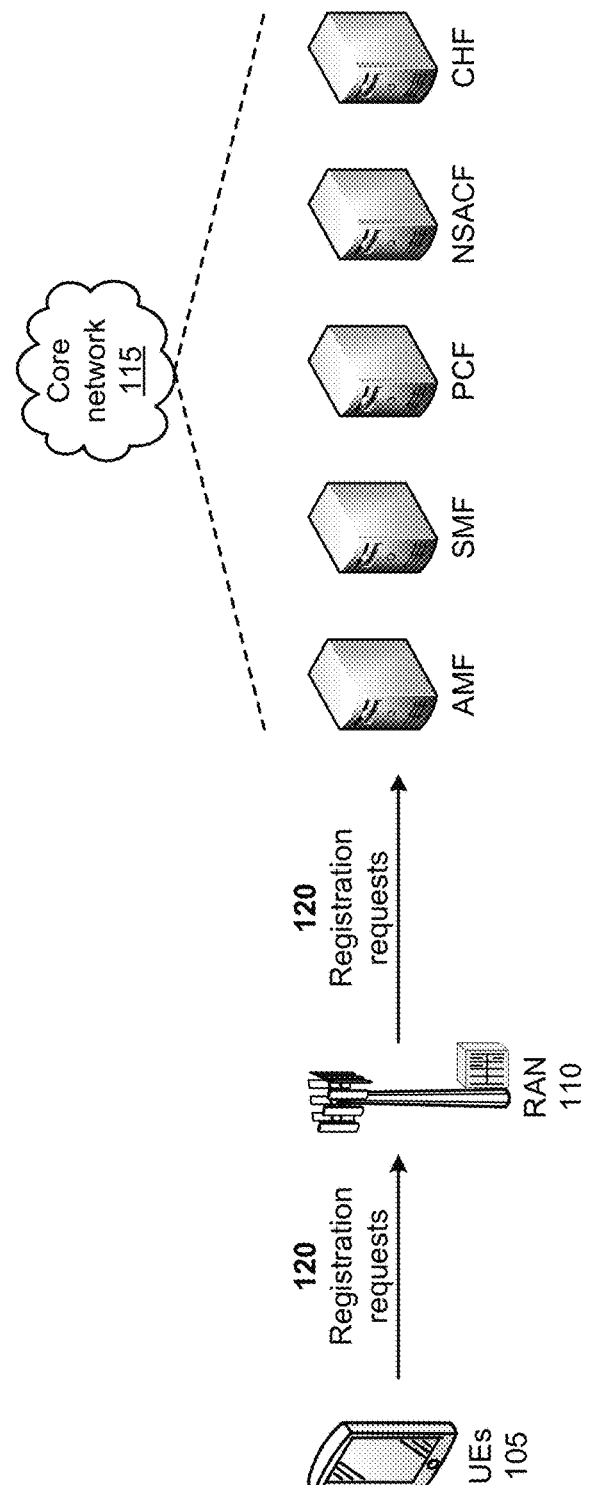
FIGS. 1A-1D are diagrams of an example associated with supporting network slice admission control based on subscription and policy control.

The following detailed description of example implementations refers to the accompanying drawings. The same reference numbers in different drawings may identify the same or similar elements.

Subject to operator policy and/or regulations, an access and mobility management function (AMF) of a core network may exempt a UE from NSAC when the UE is utilized for an emergency service or for critical and priority services (e.g., mission critical services, multimedia priority services, and/or the like), and a session management function (SMF) of the core network may exempt a PDU session from NSAC when the PDU session is utilized for an emergency service or for critical and priority services. However, the standards fail to support use cases where a UE or a PDU session is subject to NSAC based on policy control determinations or subscriptions. Currently there are no mechanisms that subject UEs and/or PDU sessions to NSAC based on subscriptions, that preclude UEs and/or PDU sessions from NSAC based on promotions, that provide NSAC based on time-of-day for peak/off-peak reduction of a quantity of UEs and/or PDU sessions in a network slice, and/or the like. Thus, current network configurations consume computing resources (e.g., processing resources, memory resources, communication resources, and/or the like), networking resources, and/or other resources associated with failing to implement NSAC based on subscriptions for UEs, failing to implement NSAC based on subscriptions for PDU sessions, failing to perform NSAC for UEs and/or PDU sessions based on policy control determinations, and/or the like.

Some implementations described herein provide a network device that supports network slice admission control based on subscription and policy control. For example, a first network device of a network may generate a first request for an indication of whether a user equipment is subject to network slice admission control, and may provide the first request for the indication to a second network device of the network. The first network device may receive, based on the first request, the indication of whether the user equipment is subject to network slice admission control, and may generate a second request for network slice admission control information based on the indication indicating that the user equipment is subject to network slice admission control. The first network device may provide the second request for the network slice admission control information to a third network device of the network.

In this way, the network device supports network slice admission control based on subscription and policy control. For example, the network device (e.g., an AMF or an SMF) may provide subscription and policy-and-charging-influenced network slice admission control. Based on subscription information indicating whether a UE is subject to NSAC, the AMF may determine whether to trigger exchanges with the NSACF. Similarly, based on subscription information indicating whether a PDU session is subject to NSAC, the SMF may determine whether to trigger exchanges with the NSACF. This may enable the AMF and/or the SMF to subject a UE and/or a PDU session to NSAC based on a subscription. Thus, the network device may conserve computing resources, networking resources, and/or other resources that would have otherwise been consumed by failing to implement NSAC based on subscriptions for UEs, failing to implement NSAC based on subscriptions for PDU sessions, failing to perform NSAC for UEs and/or PDU sessions based on policy control determinations, and/or the like.

FIGS. 1A-1D are diagrams of an example 100 associated with supporting network slice admission control based on subscription and policy control. As shown in FIGS. 1A-1D, example 100 includes UEs 105, a RAN 110, and a core network 115 that includes an access and mobility management function (AMF), a session management function (SMF), a policy control function (PCF), a network slice access control function (NSACF), and a charging function (CHF). Further details of the UEs 105, the RAN 110, the core network 115, the AMF, the SMF, the PCF, the NSACF, and the CHF are provided elsewhere herein.

As shown in FIG. 1A, and by reference number 120, the UEs 105 may provide registration requests (e.g., PDU session establishment requests) to the RAN 110, and the RAN 110 may provide the registration requests to the core network 115 (e.g., to the AMF). For example, the UEs 105 may attempt to establish PDU sessions with the core network 115, via the RAN 110, in order to communicate with other UEs 105, an application server, a cloud computing environment, and/or the like. In order to establish the PDU sessions, the UEs 105 may generate the registration requests that request establishment of the PDU sessions with the RAN 110 and the core network 115. The registration requests may also include credentials of users of the UEs 105, identifiers of the UEs 105, and/or the like. The UEs 105 may provide the registration requests to the RAN 110, and the RAN 110 may forward the registration requests to the AMF. The AMF may receive the registration requests from the RAN 110.

Figure 1B:
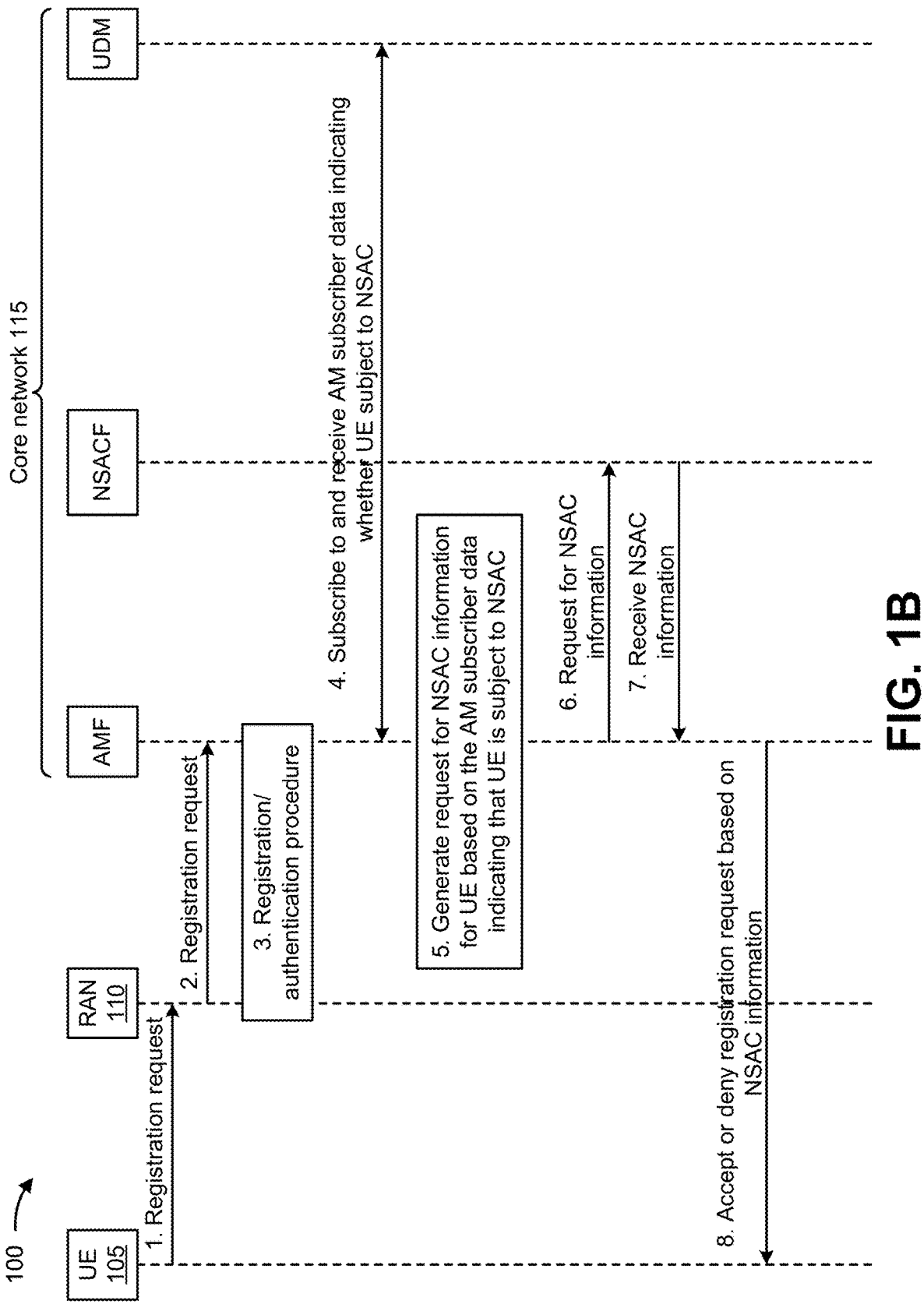
Figure 1C:
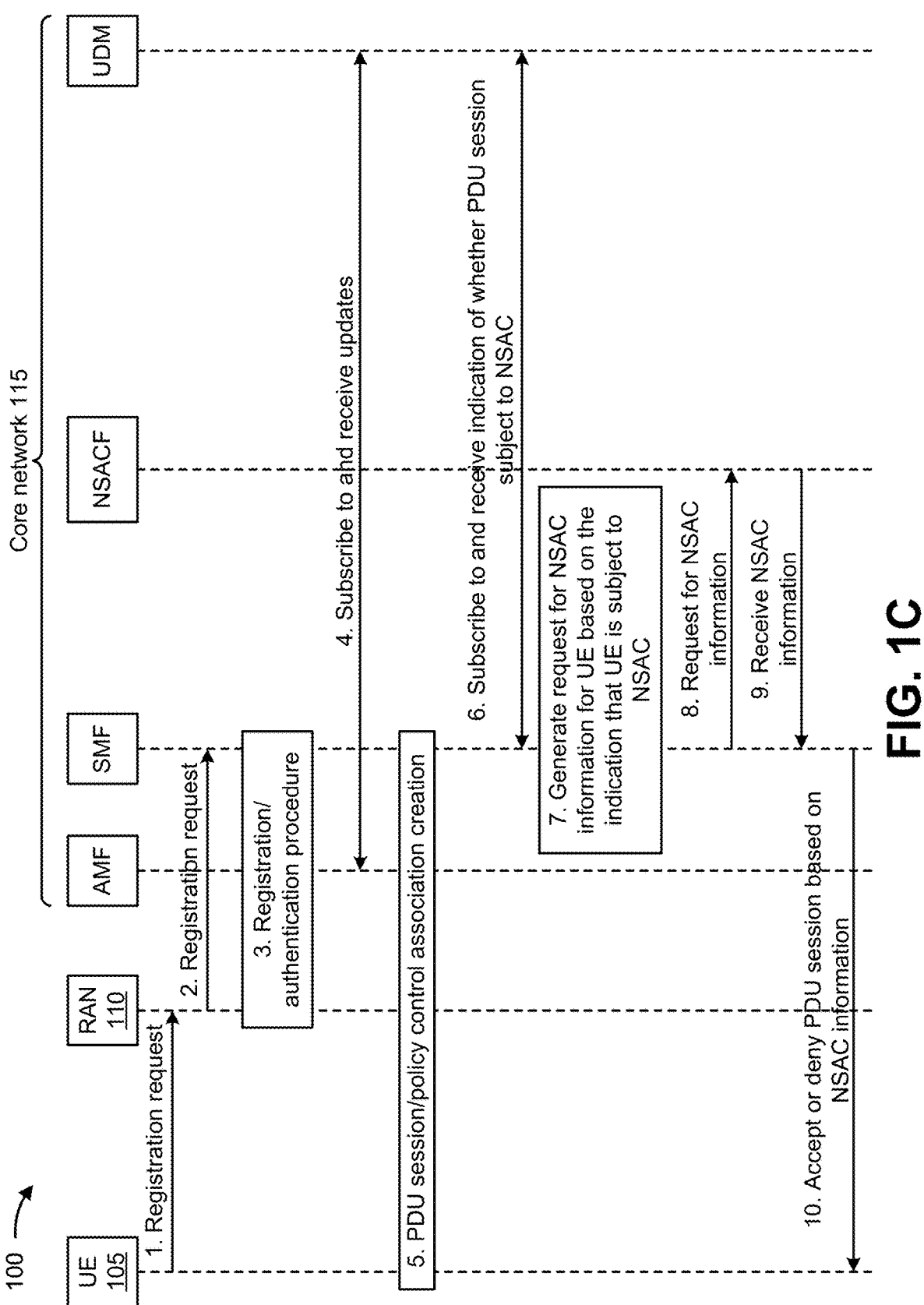
Figure 1D:
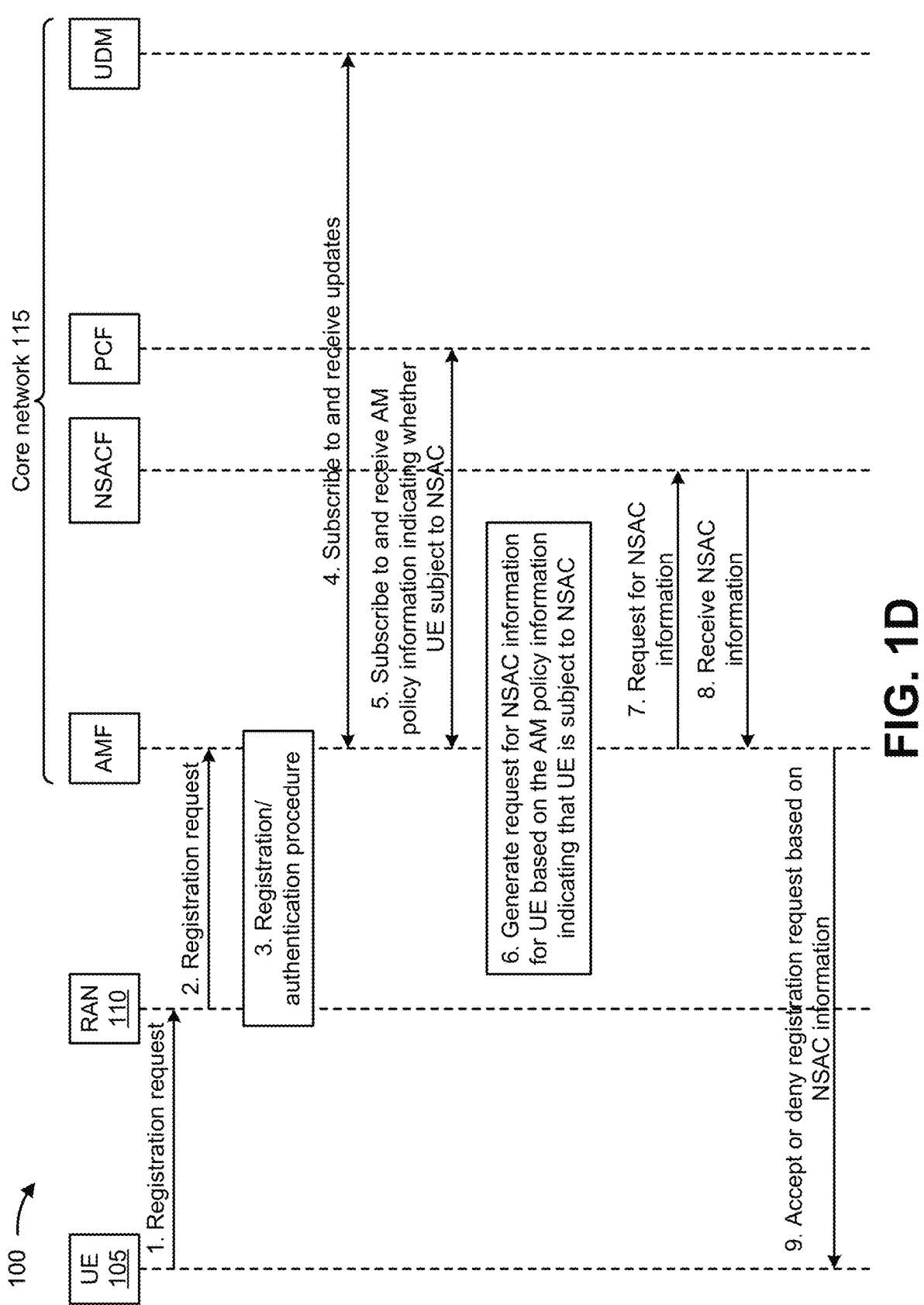

FIGS. 1B-1D are call flow diagrams depicting steps associated with supporting network slice admission control based on subscription and policy control. As shown at steps 1 and 2 of FIG. 1B, a UE 105 may provide a registration request to the RAN 110, and the RAN 110 may provide the registration request to the core network 115 (e.g., to the AMF). For example, the UE 105 may attempt to establish a PDU session with the core network 115, via the RAN 110, in order to communicate with other UEs 105, an application server, a cloud computing environment, and/or the like. The registration request may also include credentials of a user of the UE 105, an identifier of the UE 105, and/or the like. The UE 105 may provide the registration request to the RAN 110, and the RAN 110 may forward the registration request to the AMF.

As shown at step 3 of FIG. 1B, the AMF may perform a registration procedure for the UE 105 attempting to register with the core network 115, and may perform an authentication procedure to authenticate the UE 105. For example, the AMF may perform registration and authentication of the UE 105, via the RAN 110. The AMF may be responsible for handling connection and mobility management tasks, such as registering and authenticating the UE 105 for establishment of a PDU session with the core network 115. The AMF, alone or in combination with other network elements of the core network 115, may review information included in the registration request, and may deny registration and/or authentication of the UE 105, for establishment of the PDU sessions, based on the information included in the registration request. Alternatively, the AMF may allow registration and/or authentication of the UE 105, for establishment of the PDU session, based on the information included in the registration request.

As shown at step 4 of FIG. 1B, the AMF may subscribe to and receive (e.g., from a unified data management (UDM) component) access and mobility management (AM) subscriber data indicating whether the UE 105 is subject to NSAC. If the AM subscriber data indicates that the UE is not subject to NSAC, the AMF may not generate a request for NSAC information for the UE 105. As shown at step 5, the AMF may generate a request for NSAC information for the UE 105 based on the AM subscriber data indicating that the UE is subject to NSAC. As shown at step 6, the AMF may provide the request for the NSAC information for the UE 105 to the NSACF. The NSACF may receive the request and may provide the NSAC information to the AMF. As shown at step 7, the AMF may receive the NSAC information for the UE 105 from the NSACF based on the request. The NSAC information may include information identifying a maximum quantity of UEs 105 for a network slice, a maximum quantity of PDU sessions for a network slice, and/or the like.

As shown at step 8, the AMF may complete the registration of the UE 105 based on the NSAC information. In some implementations, the AMF may accept the registration request of the UE 105 based on the NSAC information (e.g., when the maximum quantity of UEs 105 for a network slice is not reached). Alternatively, the AMF may deny the registration request of the UE 105 based on the NSAC information (e.g., when the maximum quantity of UEs 105 for a network slice is satisfied).

As shown at steps 1 and 2 of FIG. 1C, a UE 105 may provide a registration request to the RAN 110, and the RAN 110 may provide the registration request to the core network 115 (e.g., to the AMF). For example, the UE 105 may attempt to establish a PDU session with the core network 115, via the RAN 110, in order to communicate with other UEs 105, an application server, a cloud computing environment, and/or the like. In order to establish the PDU session, the UE 105 may generate a request for establishment of the PDU session with the RAN 110 and the core network 115. The registration request may also include credentials of a user of the UE 105, an identifier of the UE 105, and/or the like. The UE 105 may provide the registration request to the RAN 110, and the RAN 110 may forward the registration request to the AMF.

As shown at step 3 of FIG. 1C, the AMF may perform a registration procedure for the UE 105 attempting to register with the core network 115, and may perform an authentication procedure to authenticate the UE 105. For example, the AMF may perform registration and authentication of the UE 105, via the RAN 110. The AMF may be responsible for handling connection and mobility management tasks, such as registering and authenticating the UE 105 for establishment of a PDU session with the core network 115. The AMF, alone or in combination with other network elements of the core network 115, may review information included in the registration request, and may deny registration and/or authentication of the UE 105, for establishment of the PDU sessions, based on the information included in the registration request. Alternatively, the AMF may allow registration and/or authentication of the UE 105, for establishment of the PDU session, based on the information included in the registration request. As shown at step 4, the AMF may subscribe to and receive updates (e.g., to the AM subscriber data) from the UDM component.

As shown at step 5 of FIG. 1C, the SMF may create a PDU session and policy control association for the UE 105. For example, the SMF may create the PDU session for the UE 105 based on the registration request generated by the UE 105, and may associate the PDU session with a policy control. As shown at step 6 of FIG. 1C, the SMF may subscribe to and receive (e.g., from the UDM component) an indication of whether the UE 105 is subject to NSAC. If the indication indicates that the UE is not subject to NSAC, the SMF may not generate a request for NSAC information for the UE 105. As shown at step 7, the SMF may generate a request for NSAC information for the UE 105 based on the indication indicating that the UE is subject to NSAC. As shown at step 8, the SMF may provide the request for the NSAC information for the UE 105 to the NSACF. The NSACF may receive the request and may provide the NSAC information to the SMF. As shown at step 9, the SMF may receive the NSAC information for the UE 105 from the NSACF based on the request. The NSAC information may include information identifying a maximum quantity of UEs 105 for a network slice, a maximum quantity of PDU sessions for a network slice, and/or the like.

As shown at step 10, the SMF may complete the registration of the UE 105 (e.g., creation of the PDU session) based on the NSAC information. In some implementations, the SMF may accept the PDU session of the UE 105 based on the NSAC information (e.g., when the maximum quantity of PDU sessions for a network slice is not satisfied). Alternatively, the SMF may deny the PDU session of the UE 105 based on the NSAC information (e.g., when the maximum quantity of PDU sessions for a network slice is satisfied).

As shown at steps 1 and 2 of FIG. 1D, a UE 105 may provide a registration request to the RAN 110, and the RAN 110 may provide the registration request to the core network 115 (e.g., to the AMF), as described above in connection with FIGS. 1B and 1C. As shown at step 3 of FIG. 1D, the AMF may perform a registration procedure for the UE 105 attempting to register with the core network 115, and may perform an authentication procedure to authenticate the UE 105, as described above in connection with FIGS. 1B and 1C. As shown at step 4, the AMF may subscribe to and receive updates (e.g., to the AM subscriber data) from the UDM component.

As shown at step 5 of FIG. 1D, the AMF may subscribe to and receive (e.g., from the PCF) AM policy information indicating whether the UE 105 is subject to NSAC. If the AM policy information indicates that the UE is not subject to NSAC, the AMF may not generate a request for NSAC information for the UE 105. As shown at step 6, the AMF may generate a request for NSAC information for the UE 105 based on the AM policy information indicating that the UE is subject to NSAC. As shown at step 7, the AMF may provide the request for the NSAC information for the UE 105 to the NSACF. The NSACF may receive the request and may provide the NSAC information to the AMF. As shown at step 8, the AMF may receive the NSAC information for the UE 105 from the NSACF based on the request. The NSAC information may include information identifying a maximum quantity of UEs 105 for a network slice, a maximum quantity of PDU sessions for a network slice, and/or the like.

As shown at step 9, the AMF may complete the registration of the UE 105 based on the NSAC information. In some implementations, the AMF may accept the registration request of the UE 105 based on the NSAC information (e.g., when the maximum quantity of UEs 105 for a network slice is not satisfied). Alternatively, the AMF may deny the registration request of the UE 105 based on the NSAC information (e.g., when the maximum quantity of UEs 105 for a network slice is satisfied).

In this way, the network device supports network slice admission control based on subscription and policy control. For example, the network device (e.g., an AMF or an SMF) may provide subscription and policy-and-charging-influenced network slice admission control. Based on subscription information indicating whether a UE 105 is subject to NSAC, the AMF may determine whether to trigger exchanges with the NSACF. Similarly, based on subscription information indicating whether a PDU session is subject to NSAC, the SMF may determine whether to trigger exchanges with the NSACF. This may enable the AMF and/or the SMF to subject a UE 105 and/or a PDU session to NSAC based on a subscription. Thus, the network device may conserve computing resources, networking resources, and/or other resources that would have otherwise been consumed by failing to implement NSAC based on subscriptions for UEs 105, failing to implement NSAC based on subscriptions for PDU sessions, failing to perform NSAC for UEs 105 and/or PDU sessions based on policy control determinations, and/or the like.

As indicated above, FIGS. 1A-1D are provided as an example. Other examples may differ from what is described with regard to FIGS. 1A-1D. The number and arrangement of devices shown in FIGS. 1A-1D are provided as an example. In practice, there may be additional devices, fewer devices, different devices, or differently arranged devices than those shown in FIGS. 1A-1D. Furthermore, two or more devices shown in FIGS. 1A-1D may be implemented within a single device, or a single device shown in FIGS. 1A-1D may be implemented as multiple, distributed devices. Additionally, or alternatively, a set of devices (e.g., one or more devices) shown in FIGS. 1A-1D may perform one or more functions described as being performed by another set of devices shown in FIGS. 1A-1D.

Figure 2:
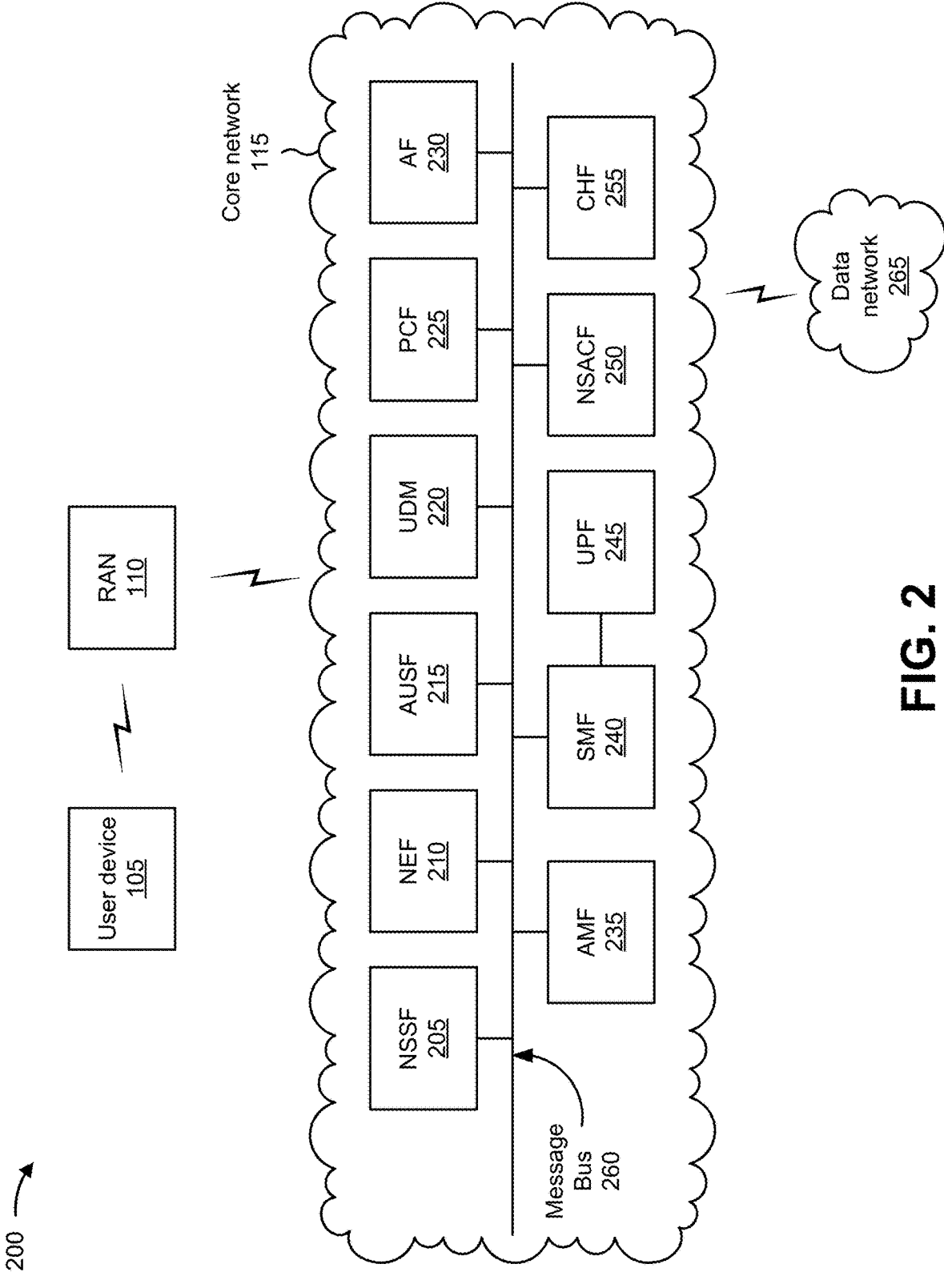
FIG. 2 is a diagram of an example environment in which systems and/or methods described herein may be implemented.

FIG. 2 is a diagram of an example environment 200 in which systems and/or methods described herein may be implemented. As shown in FIG. 2, the example environment 200 may include the UE 105, the RAN 110, the core network 115, and a data network 265. Devices and/or networks of the example environment 200 may interconnect via wired connections, wireless connections, or a combination of wired and wireless connections.

The UE 105 includes one or more devices capable of receiving, generating, storing, processing, and/or providing information, such as information described herein. For example, the UE 105 can include a mobile phone (e.g., a smart phone or a radiotelephone), a laptop computer, a tablet computer, a desktop computer, a handheld computer, a gaming device, a wearable communication device (e.g., a smart watch or a pair of smart glasses), a mobile hotspot device, a fixed wireless access device, customer premises equipment, an autonomous vehicle, or a similar type of device.

The RAN 110 may support, for example, a cellular radio access technology (RAT). The RAN 110 may include one or more base stations (e.g., base transceiver stations, radio base stations, node Bs, eNodeBs (eNBs), gNodeBs (gNBs), base station subsystems, cellular sites, cellular towers, access points, transmit receive points (TRPs), radio access nodes, macrocell base stations, microcell base stations, picocell base stations, femtocell base stations, or similar types of devices) and other network entities that can support wireless communication for the UE 105. The RAN 110 may transfer traffic between the UE 105 (e.g., using a cellular RAT), one or more base stations (e.g., using a wireless interface or a backhaul interface, such as a wired backhaul interface), and/or the core network 115. The RAN 110 may provide one or more cells that cover geographic areas.

In some implementations, the RAN 110 may perform scheduling and/or resource management for the UE 105 covered by the RAN 110 (e.g., the UE 105 covered by a cell provided by the RAN 110). In some implementations, the RAN 110 may be controlled or coordinated by a network controller, which may perform load balancing, network-level configuration, and/or other operations. The network controller may communicate with the RAN 110 via a wireless or wireline backhaul. In some implementations, the RAN 110 may include a network controller, a self-organizing network (SON) module or component, or a similar module or component. In other words, the RAN 110 may perform network control, scheduling, and/or network management functions (e.g., for uplink, downlink, and/or sidelink communications of the UE 105 covered by the RAN 110).

In some implementations, the core network 115 may include an example functional architecture in which systems and/or methods described herein may be implemented. For example, the core network 115 may include an example architecture of a 5G next generation (NG) core network included in a 5G wireless telecommunications system. While the example architecture of the core network 115 shown in FIG. 2 may be an example of a service-based architecture, in some implementations, the core network 115 may be implemented as a reference-point architecture and/or a 4G core network, among other examples.

As shown in FIG. 2, the core network 115 may include a number of functional elements. The functional elements may include, for example, a network slice selection function (NSSF) 205, a network exposure function (NEF) 210, an authentication server function (AUSF) 215, a unified data management (UDM) component 220, a PCF 225, an application function (AF) 230, an AMF 235, an SMF 240, a user plane function (UPF) 245, an NSACF 250, and/or a CHF 255. These functional elements may be communicatively connected via a message bus 260. Each of the functional elements shown in FIG. 2 is implemented on one or more devices associated with a wireless telecommunications system. In some implementations, one or more of the functional elements may be implemented on physical devices, such as an access point, a base station, and/or a gateway. In some implementations, one or more of the functional elements may be implemented on a computing device of a cloud computing environment.

The NSSF 205 includes one or more devices that select network slice instances for the UE 105. By providing network slicing, the NSSF 205 allows an operator to deploy multiple substantially independent end-to-end networks potentially with the same infrastructure. In some implementations, each slice may be customized for different services.

The NEF 210 includes one or more devices that support exposure of capabilities and/or events in the wireless telecommunications system to help other entities in the wireless telecommunications system discover network services.

The AUSF 215 includes one or more devices that act as an authentication server and support the process of authenticating the UE 105 in the wireless telecommunications system.

The UDM 220 includes one or more devices that store user data and profiles in the wireless telecommunications system. The UDM 220 may be used for fixed access and/or mobile access in the core network 115.

The PCF 225 includes one or more devices that provide a policy framework that incorporates network slicing, roaming, packet processing, and/or mobility management, among other examples.

The AF 230 includes one or more devices that support application influence on traffic routing, access to the NEF 210, and/or policy control, among other examples.

The AMF 235 includes one or more devices that act as a termination point for non-access stratum (NAS) signaling and/or mobility management, among other examples.

The SMF 240 includes one or more devices that support the establishment, modification, and release of communication sessions in the wireless telecommunications system. For example, the SMF 240 may configure traffic steering policies at the UPF 245 and/or may enforce user equipment IP address allocation and policies, among other examples.

The UPF 245 includes one or more devices that serve as an anchor point for intraRAT and/or interRAT mobility. The UPF 245 may apply rules to packets, such as rules pertaining to packet routing, traffic reporting, and/or handling user plane QoS, among other examples.

The NSACF 250 includes one or more devices that control and monitor a quantity of registered UEs per single network slice selection assistance information (S-NSSAI) and a quantity of PDU sessions per S-NSSAI.

The CHF 255 includes one or more devices that enable the core network 115 to charge for features, such as a quality of service (QOS), service availability, latency, service level agreement features, bandwidth slice-based features, location-based features, data volume, throughput, reliability, security, energy efficiency, and/or the like.

The message bus 260 represents a communication structure for communication among the functional elements. In other words, the message bus 260 may permit communication between two or more functional elements.

The data network 265 includes one or more wired and/or wireless data networks. For example, the data network 265 may include an IP Multimedia Subsystem (IMS), a public land mobile network (PLMN), a local area network (LAN), a wide area network (WAN), a metropolitan area network (MAN), a private network such as a corporate intranet, an ad hoc network, the Internet, a fiber optic-based network, a cloud computing network, a third-party services network, an operator services network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the example environment 200 may perform one or more functions described as being performed by another set of devices of the example environment 200.

Figure 3:
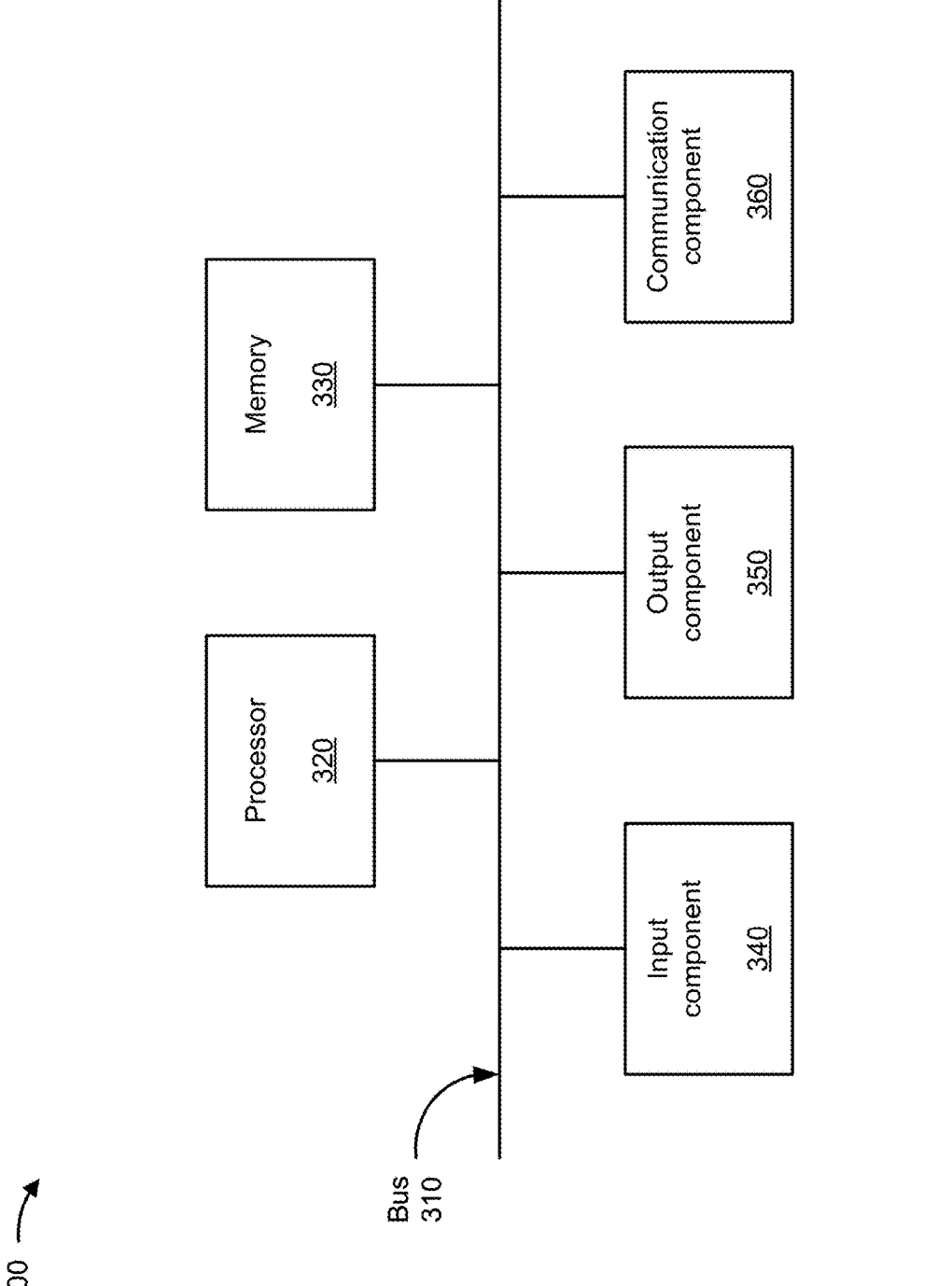
FIG. 3 is a diagram of example components of one or more devices of FIG. 2.

FIG. 3 is a diagram of example components of a device 300, which may correspond to the UE 105, the RAN 110, the NSSF 205, the NEF 210, the AUSF 215, the UDM 220, the PCF 225, the AF 230, the AMF 235, the SMF 240, the UPF 245, the NSACF 250, and/or the CHF 255. In some implementations, the UE 105, the RAN 110, the NSSF 205, the NEF 210, the AUSF 215, the UDM 220, the PCF 225, the AF 230, the AMF 235, the SMF 240, the UPF 245, the NSACF 250, and/or the CHF 255 may include one or more devices 300 and/or one or more components of the device 300. As shown in FIG. 3, the device 300 may include a bus 310, a processor 320, a memory 330, an input component 340, an output component 350, and a communication component 360.

The bus 310 includes one or more components that enable wired and/or wireless communication among the components of the device 300. The bus 310 may couple together two or more components of FIG. 3, such as via operative coupling, communicative coupling, electronic coupling, and/or electric coupling. The processor 320 includes a central processing unit, a graphics processing unit, a microprocessor, a controller, a microcontroller, a digital signal processor, a field-programmable gate array, an application-specific integrated circuit, and/or another type of processing component. The processor 320 is implemented in hardware, firmware, or a combination of hardware and software. In some implementations, the processor 320 includes one or more processors capable of being programmed to perform one or more operations or processes described elsewhere herein.

The memory 330 includes volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. Memory 330 stores information, instructions, and/or software (e.g., one or more software applications) related to the operation of the device 300. In some implementations, the memory 330 includes one or more memories that are coupled to one or more processors (e.g., the processor 320), such as via the bus 310.

The input component 340 enables the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 enables the device 300 to provide output, such as via a display, a speaker, and/or a light-emitting diode. The communication component 360 enables the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., the memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

FIG. 4 is a flowchart of an example process 400 for supporting network slice admission control based on subscription and policy control. In some implementations, one or more process blocks of FIG. 4 may be performed by a network device (e.g., the AMF 235). In some implementations, one or more process blocks of FIG. 4 may be performed by another device or a group of devices separate from or including the network device, such as an SMF (e.g., the SMF 240), a RAN (e.g., the RAN 110), and/or a PCF (e.g., the PCF 225). Additionally, or alternatively, one or more process blocks of FIG. 4 may be performed by one or more components of the device 300, such as the processor 320, the memory 330, the input component 340, the output component 350, and/or the communication component 360.

As shown in FIG. 4, process 400 may include generating a first request for an indication of whether a user equipment is subject to network slice admission control (block 410). For example, the first network device may generate a first request for an indication of whether a user equipment is subject to network slice admission control, as described above. In some implementations, generating the first request for the indication of whether the user equipment is subject to network slice admission control includes generating the first request for the indication of whether a protocol data unit session, associated with the user equipment, is subject to network slice admission control. In some implementations, the indication of whether the user equipment is subject to network slice admission control is based on one of a subscription associated with the user equipment or policy control information associated with the user equipment.

As further shown in FIG. 4, process 400 may include providing the first request for the indication to a second network device of the network (block 420). For example, the first network device may provide the first request for the indication to a second network device of the network, as described above.

As further shown in FIG. 4, process 400 may include receiving, based on the first request, the indication of whether the user equipment is subject to network slice admission control (block 430). For example, the first network device may receive, based on the first request, the indication of whether the user equipment is subject to network slice admission control, as described above.

As further shown in FIG. 4, process 400 may include generating a second request for network slice admission control information based on the indication indicating that the user equipment is subject to network slice admission control (block 440). For example, the first network device may generate a second request for network slice admission control information based on the indication indicating that the user equipment is subject to network slice admission control, as described above.

As further shown in FIG. 4, process 400 may include providing the second request for the network slice admission control information to a third network device of the network (block 450). For example, the first network device may provide the second request for the network slice admission control information to a third network device of the network, as described above. In some implementations, the first network device includes an access and mobility management function, the second network device includes a unified data management component, and the third network device includes a network slice admission control function. In some implementations, the first network device includes an access and mobility management function, the second network device includes a policy control function, and the third network device includes a network slice admission control function. In some implementations, the first network device includes a session management function, the second network device includes a policy control function, and the third network device includes a network slice admission control function.

In some implementations, process 400 includes receiving the network slice admission control information from the third network device based on the second request, determining a policy for the user equipment based on the network slice admission control information, and causing the policy to be implemented for the user equipment. In some implementations, determining the policy for the user equipment based on the network slice admission control information includes accepting or denying a registration request of the user equipment based on the network slice admission control information.

In some implementations, determining the policy for the user equipment based on the network slice admission control information includes accepting or denying a protocol data unit session, associated with the user equipment, based on the network slice admission control information. In some implementations, causing the policy to be implemented for the user equipment includes accepting or denying a registration request of the user equipment. In some implementations, causing the policy to be implemented for the user equipment includes accepting or denying a protocol data unit session associated with the user equipment.

In some implementations, process 400 includes receiving a registration request from the user equipment, and performing a registration procedure for the user equipment based on the registration request. In some implementations, process 400 includes receiving a registration request from the user equipment, and authenticating the user equipment based on the registration request.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:

generating, by a first network device of a network, a first request for an indication of whether a user equipment is subject to network slice admission control;

providing, by the first network device and to a second network device, the first request for the indication, wherein the second network device includes a policy control function (PCF);

receiving, by the first network device, from the second network device and based on the first request, the indication of whether the user equipment is subject to network slice admission control;

generating, by the first network device, a second request for network slice admission control information based on the indication indicating that the user equipment is subject to network slice admission control; and providing, by the first network device, the second request for the network slice admission control information to a third network device.

2. The method of claim 1, further comprising: receiving the network slice admission control information from the third network device based on the second request;

determining a policy for the user equipment based on the network slice admission control information; and causing the policy to be implemented for the user equipment.

3. The method of claim 2, wherein determining the policy for the user equipment based on the network slice admission control information comprises:

accepting or denying a registration request of the user equipment based on the network slice admission control information.

4. The method of claim 2, wherein determining the policy for the user equipment based on the network slice admission control information comprises:

accepting or denying a protocol data unit session, associated with the user equipment, based on the network slice admission control information.

5. The method of claim 2, wherein causing the policy to be implemented for the user equipment comprises:

accepting or denying a registration request of the user equipment.

6. The method of claim 2, wherein causing the policy to be implemented for the user equipment comprises:

accepting or denying a protocol data unit session associated with the user equipment.

7. The method of claim 1, wherein the first network device includes an access and mobility management function (AMF), and the third network device includes a network slice admission control function (NSACF).

8. A first network device of a network, comprising: one or more processors configured to:

generate a first request for an indication of whether a user equipment is subject to network slice admission control;

provide the first request for the indication to a second network device, wherein the second network device includes a policy control function (PCF);

receive, from the second network device based on the first request, the indication of whether the user equipment is subject to network slice admission control;

generate a second request for network slice admission control information based on the indication indicating that the user equipment is subject to network slice admission control;

provide the second request for the network slice admission control information to a third network device;

receive the network slice admission control information from the third network device based on the second request;

determine a policy for the user equipment based on the network slice admission control information; and cause the policy to be implemented for the user equipment.

9. The first network device of claim 8, wherein the first network device includes an access and mobility management function (AMF), the and the third network device includes a network slice admission control function (NSACF).

10. The first network device of claim 8, wherein the first network device includes a session management function (SMF), and the third network device includes a network slice admission control function (NSACF).

11. The first network device of claim 8, wherein the one or more processors, to generate the first request for the indication of whether the user equipment is subject to network slice admission control, are configured to:

generate the first request for the indication of whether a protocol data unit session, associated with the user equipment, is subject to network slice admission control.

12. The first network device of claim 8, wherein the indication of whether the user equipment is subject to network slice admission control is based on one of a subscription associated with the user equipment or policy control information associated with the user equipment.

13. The first network device of claim 8, wherein the one or more processors are further configured to:

receive a registration request from the user equipment; and perform a registration procedure for the user equipment based on the registration request.

14. The first network device of claim 8, wherein the one or more processors are further configured to:

receive a registration request from the user equipment; and authenticate the user equipment based on the registration request.

15. A non-transitory computer-readable medium storing a set of instructions, the set of instructions comprising:

one or more instructions that, when executed by one or more processors of a first network device of a network, cause the first network device to:

generate a first request for an indication of whether a user equipment is subject to network slice admission control;

provide the first request for the indication to a second network device, wherein the second network device is a policy control function (PCF);

receive, from the second network device and based on the first request, the indication of whether the user equipment is subject to network slice admission control;

generate a second request for network slice admission control information based on the indication indicating that the user equipment is subject to network slice admission control;

provide the second request for the network slice admission control information to a third network device;

receive the network slice admission control information from the third network device based on the second request; and determine a policy for the user equipment based on the network slice admission control information.

16. The non-transitory computer-readable medium of claim 15, wherein the one or more instructions, that cause the first network device to determine the policy for the user equipment based on the network slice admission control information, cause the first network device to:

accept or deny a registration request of the user equipment based on the network slice admission control information.

17. The non-transitory computer-readable medium of claim 15, wherein the one or more instructions, that cause the first network device to determine the policy for the user equipment based on the network slice admission control information, cause the first network device to:

accept or deny a protocol data unit session, associated with the user equipment, based on the network slice admission control information.

18. The non-transitory computer-readable medium of claim 15, wherein the one or more instructions, that cause the first network device to generate the first request for the indication of whether the user equipment is subject to network slice admission control, cause the first network device to:

generate the first request for the indication of whether a protocol data unit session, associated with the user equipment, is subject to network slice admission control.

19. The non-transitory computer-readable medium of claim 15, wherein the indication of whether the user equipment is subject to network slice admission control is based on one of a subscription associated with the user equipment or policy control information associated with the user equipment.

20. The non-transitory computer-readable medium of claim 15, wherein the one or more instructions further cause the first network device to:

receive a registration request from the user equipment;

perform a registration procedure for the user equipment based on the registration request; and authenticate the user equipment based on the registration request.

* * * * *